United States Patent Office 2,803,628
Patented Aug. 20, 1957

2,803,628

NEW TRIAZINE DERIVATIVES

Albert Frederick Crowther, Blackley, Manchester, England, assignor to Imperial Chemical Industries Limited, a corporation of Great Britain No Drawing. Application August 30, 1951, Serial No. 244,460

Claims priority, application Great Britain September 12, 1950

8 Claims. (Cl. 260—249.9)

This invention relates to new triazine derivatives and more particularly it relates to new triazine derivatives which possess valuable antimalarial properties.

According to the invention we provide the said new triazine derivatives which are of the formula

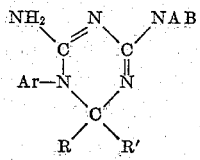

wherein Ar stands for an aromatic residue which may optionally be substituted in the meta or para positions and wherein A, B, R and R' stand for hydrogen or for hydrocarbon radicals which may optionally be substituted provided that R and R' be not both hydrogen at the same time and wherein R and R' may be combined to form a homocyclic ring.

The triazine derivatives of our invention preferred for use as antimalarials are those of the formula

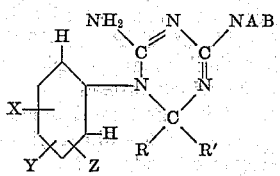

wherein X stands for hydrogen, alkyl, alkoxy, chlorine, bromine or iodine, wherein Y and Z stand for hydrogen, alkyl, chlorine, bromine, or iodine, wherein A and B stand for hydrogen or alkyl and wherein R stands for hydrogen or alkyl and R' stands for hydrocarbon which may bear substituents and wherein R and R' may be combined to form a homocyclic ring.

Thus we have found that, for example, the compounds 2:4 - diamino - 1 - p-chlorophenyl - 6:6 - dimethyl-1:6-dihydro - 1:3:5 - triazine and 2:4 - diamino - 1 - (3:4 - dichlorophenyl) - 6:6 - dimethyl - 1:6 - dihydro-1:3:5-triazine possess very high antimalarial activity when tested against *Plasmodium gallinaceum* in chicks.

According to a further feature of the invention we provide a process for the manufacture of the said new compounds which comprises interaction of a biguanide of the formula:

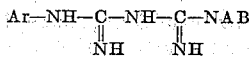

wherein Ar, A and B have the meaning stated above, with an aldehyde or ketone of the formula RR'C=O preferably in the presence of at least one equivalent proportion of an acid.

The process of this feature of the invention may be carried out by mixing, preferably by heating, the reactants together in solution in a suitable liquid medium, for example in water or in aqueous ethyl alcohol.

As said the reaction is brought about preferably in presence of at least one equivalent proportion of an acid.

Thus for example the biguanide may be used in the form of a salt thereof, preferably with a mineral acid. Thus if the acid is hydrochloric acid there may be used for example the biguanide dihydrochloride or, alternatively, and more conveniently, the reaction may be carried out using the biguanide monohydrochloride in aqueous medium containing hydrochloric acid.

We have also found that the biguanide of the stated formula and/or the aldehyde or ketone of stated formula may be replaced by a substance or substances capable of giving rise to the said biguanide and/or the said aldehyde or ketone or of acting in a manner similar to the said biguanide and/or the said aldehyde or ketone and this modified process comprises yet a further feature of the invention.

Thus for example in place of the aldehyde or ketone of formula RR'C=O, wherein R and R' have the meaning stated above, there may be used substances capable of giving rise by degradation to the aldehyde or ketone for example there may be used a functional derivative of the said aldehyde or ketone. Such functional derivative of the aldehyde or ketone may be for example the acetal, the derived Schiff's Base, for example the anil, an alkali metal bisulphite compound, or an ester of the enol form of the aldehyde or ketone, for example, in the case of acetone, isopropenyl acetate.

The functional derivative of the aldehyde or ketone is capable of giving rise to the said aldehyde or ketone and it may be surmised, but this suggestion is put forward only by way of explanation, that the said functional derivatives do in fact under the conditions of the reaction give rise to the aldehyde or ketone in situ.

Also by way of example of substances capable of giving rise to the aldehyde or ketone there may be used substances which give rise to the aldehyde or ketone by synthesis, thus for example in place of acetaldehyde there may be used acetylene in acid medium in the presence of a suitable catalyst, for example mercuric chloride.

Further by way of example the biguanide of the formula

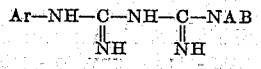

wherein Ar, A and B have the meaning stated above may be replaced by substances capable of giving rise to the biguanide by synthesis for example by a salt of the amine, ArNH₂, and the dicyandiamide

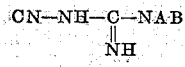

Moreover both the biguanide and the aldehyde or ketone may simultaneously be generated in situ. Thus as a functional derivative of the aldehyde or ketone there may be used the anil derived from the aldehyde or ketone and the aromatic amine ArNH₂, wherein Ar has the meaning stated above, and in place of the biguanide there may be used dicyandiamide, it being suggested, by way only of explanation, that the biguanide is generated by reaction of the liberated amine ArNH₂ and the dicyandiamide.

The invention is illustrated but not limited by the following examples in which the parts are by weight.

*Example 1*

5 parts of N'-p-chlorophenylbiguanide hydrochloride are dissolved in 50 parts of water. 25 parts of acetone are added and the solution is boiled under reflux for 23 hours. It is then cooled to 5° C. and so kept while 5 parts of 40% aqueous sodium hydroxide are added. The mixture is extracted with 125 parts of ether in 3 portions and 35% aqueous hydrochloric acid is added to the aqueous part kept at 5° C. until it has pH 6–7. The mixture is filtered and 10 parts of saturated aqueous picric acid are added to the filtrate. It is then filtered and the solid residue is washed with water and dried. It consists of 2:4-diamino - 1 - p - chlorophenyl - 6:6 - dimethyl - 1:6-dihydro-1:3:5-triazine picrate of M. P. 205° C.

*Example 2*

20 parts of p-chlorophenylbiguanide hydrochloride, 200 parts of water, 100 parts of acetone and 8.3 parts of 35.6% aqueous hydrochloric acid are heated together at 50° C. for 16 hours. The solution is then evaporated under reduced pressure to half its volume. It is then filtered. 200 parts of ether are added to the filtrate and the mixture is stirred and cooled to 0–5° C. and 40% sodium hydroxide solution is added slowly until no more solid separates. The mixture is then filtered and the solid residue is washed with ether and dried. It is then dissolved in moist chloroform, the solution is filtered and ether is added to the filtrate which is then filtered and the residue is washed with a mixture of moist chloroform and ether and dried. It consists of 2:4-diamino-1-p-chlorophenyl - 6:6 - dimethyl - 1:6 - dihydro - 1:3:5 - triazine of M. P. 143° C. The monohydrochloride of this base has M. P. 204–205° C.

By using p-iodophenylbiguanide hydrochloride in place of p-chlorophenylbiguanide, and working in a similar manner there is obtained 2:4-diamino-1-p-iodophenyl-6:6-dimethyl-1:6-dihydro-1:3:5-triazine. The crude base is added to cold alcoholic hydrogen chloride and the mixture is diluted with ethyl acetate. The solid is removed by filtration and is crystallised from ethanol to give colourless crystals of 2:4-diamino-1-p-iodophenyl-6:6-dimethyl-1:6 - dihydro - 1:3:5 - triazine hydrochloride, of M. P. 201° C.

In a similar manner, using 3:4:5-trichlorophenylbiguanide hydrochloride (prepared by heating 3:4:5-trichloroaniline hydrochloride with dicyandiamide in solution in 2-ethoxyethanol, M. P. 271° C.) there is obtained 2:4-diamino - 1 - (3:4:5 - trichlorophenyl) - 6:6 - dimethyl - 1:6 - dihydro - 1:3:5 - triazine hydrochloride of M. P. 204° C.

In a similar manner using p-chlorophenylbiguanide hydrochloride in place of 3:4-dichlorophenylbiguanide hydrochloride and cyclopentanone in place of acetone there is obtained similarly 2:4-diamino-1-p-chlorophenyl-6:6-cyclotetramethylene - 1:6 - dihydro - 1:3:5 - triazine hydrochloride which crystallises from water and has M. P. 221–222° C.

*Example 3*

4.65 parts of 3:4-dichlorophenylbiguanide hydrochloride, prepared from 3:4-dichloroaniline hydrochloride and dicyandiamide, M. P. 214–5° C., 31.5 parts of water, 23.2 parts of acetone and 16.5 parts of 3.6% aqueous hydrochloric acid are mixed together and the mixture is subjected to processes as described in Example 2. The product so obtained consists of 2:4-diamino-1-(3:4-dichlorophenyl) - 6:6 - dimethyl - 1:6 - dihydro - 1:3:5-triazine of M. P. 140° C. The hydrochloride of this base has M. P. 198–199° C.

*Example 4*

37 parts of p-chlorophenylbiguanide monohydrochloride, 15.2 parts of 36% hydrochloric acid, 83 parts of methyl ethyl ketone and 200 parts of water are heated together at 70° C. for 15 hours. The solution is evaporated to half its volume under reduced pressure, and is then cooled and filtered. The filtrate is cooled to 3° C., made alkaline to Clayton yellow by the addition of 40% aqueous sodium hydroxide solution, filtered and the solid is extracted with ether. It is then crystallised from a mixture of moist chloroform and ether to give 2:4-diamino-1-p-chlorophenyl - 6 - ethyl - 6 - methyl - 1:6-dihydro-1:3:5-triazine, of M. P. 138–139° C. The hydrochloride of this base has M. P. 208° C.

*Example 5*

100 parts of p-bromophenylbiguanide monohydrochloride, 1000 parts of water and 500 parts of acetone are boiled together under reflux for 16 hours. The solution is then evaporated to half its volume under reduced pressure, cooled and filtered. 1000 parts of ether are added to the filtrate, the mixture is cooled to 0–5° C. and stirred and 100 parts of 40% sodium hydroxide solution are added. The aqueous part is separated and then extracted with 1500 parts of ether. It is then neutralised with 35.6% aqueous hydrochloric acid and filtered. A saturated aqueous solution of picric acid is added to the filtrate and the mixture is filtered. The solid residue is washed with water, dried and crystallised from ethanol. There is thus obtained 2:4-diamino - 1 - p - bromophenyl-6:6 - dimethyl - 1:6 - dihydro - 1:3:5 - triazine picrate as yellow crystals of M. P. 199° C. The picrate is shaken with 6% aqueous hydrochloric acid and ether, the aqueous part is cooled to 0° C. and 40% sodium hydroxide solution is added. It is then filtered and the solid residue is washed with ice-cold water and dried. It is crystallised from a mixture of moist chloroform and ether to give colourless crystals of 2:4-diamino-1-p-bromophenyl - 6:6 - dimethyl - 1:6 - dihydro - 1:3:5-triazine of M. P. 141–142° C.

*Example 6*

20 parts of p-bromophenylbiguanide monohydrochloride, 200 parts of water, 100 parts of acetone and 8.1 parts of 35.6% aqueous hydrochloric acid are boiled together under reflux for 16 hours and the mixture is subjected to the same process as described in Example 2. The crude base is suspended in ethylacetate, alcoholic hydrogen chloride is added until the mixture has pH 1.2. It is filtered and the solid residue is washed with ethyl acetate, dried and crystallised from ethanol. There are thus obtained colourless crystals of 2:4-diamino - 1 - p-bromophenyl - 6:6 - dimethyl - 1:6 - dihydro - 1:3:5-triazine hydrochloride of M. P. 199–200° C.

By working in a similar manner, using m-chlorophenylbiguanide hydrochloride instead of p-bromophenylbiguanide hydrochloride there is obtained 2:4 - diamino-1 - m - chlorophenyl - 6:6 - dimethyl - 1:6 - dihydro-1:3:5 - triazine hydrochloride of M. P. 191° C.

*Example 7*

25.5 parts of p-chloroaniline, 20.6 parts of 35.6% aqueous hydrochloric acid, 17 parts of dicyandiamide and 50 parts of water are boiled together under reflux for 1 hour. 180 parts of water, 20.6 parts of 35.6% aqueous hydrochloric acid and 125 parts of acetone are then added and the whole is boiled under reflux for 18 hours. The mixture is distilled under reduced pressure to half its volume, cooled and filtered. 200 parts of ether are added to the filtrate, it is cooled to 3° C. and shaken vigorously while 40 parts of 40% sodium hydroxide solution are added. The mixture is filtered and the solid residue is washed with ether and dried. It is crystallised from moist chloroform and ether and then consists of 2:4-diamino-1-p-chlorophenyl-6:6 - dimethyl - 1:6 - dihydro - 1:3:5-triazine of M. P. 143° C.

By working in a similar manner, with replacement of p-chloroaniline by p-anisidine, there is obtained 2:4-diamino - 1 - p - methoxyphenyl-6:6-dimethyl-1:6-dihydro-1:3:5-triazine. The crude base is dissolved in an excess of cold 7.3% aqueous hydrochloric acid. The solution is decolourised by carbon and filtered, and the filtrate is neutralised with aqueous ammonia. The solid product is separated and recrystallised from ethanol to give 2:4 - diamino - 1 - p - methoxyphenyl-6:6-dimethyl-1:6-dihydro-1:3:5-triazine hydrochloride, of M. P. 200–201° C.

Similarly, using other primary aromatic amines, there are obtained: from p-phenetidine, 2:4-diamino-1-p- ethoxyphenyl - 6:6 - dimethyl - 1:6 - dihydro - 1:3:5-triazine hydrochloride, colourless crystals from water, of M. P. 212–213° C.; from p-toluidine, 2:4-diamino-1-p-tolyl - 6:6 - dimethyl - 1:6 - dihydro - 1:3:5 - triazine hydrochloride, of M. P. 197–198° C.; from 3:4-xylidine, 2:4 - diamino - 1 - (3:4 - dimethylphenyl) - 6:6 - dimethyl-1:6-dihydro-1:3:5-triazine hydrochloride, of M. P. 198–200° C.; from m-bromoaniline, 2:4-diamino-1-m-bromophenyl - 6:6 - dimethyl - 1:6 - dihydro - 1:3:5-triazine hydrochloride, of M. P. 217–218° C.; from m-iodoaniline, 2:4 - diamino - 1 - m - iodophenyl - 6:6 - dimethyl - 1:6 - dihydro - 1:3:5 - triazine hydrochloride, of M. P. 214–215° C.; from aniline, 2:4-diamino-1-phenyl - 6:6 - dimethyl - 1:6 - dihydro - 1:3:5 - triazine hydrochloride, of M. P. 204° C.; from 4-chloro-3-methylaniline, 2:4 - diamino - 1 - (4 - chloro - 3 - methylphenyl-6:6 - dimethyl - 1:6 - dihydro - 1:3:5 - triazine hydrochloride of M. P. 210–211° C.

Example 8

24.5 parts of 3:4 - dibromophenylbiguanide hydrochloride (prepared from 3:4-dibromoaniline hydrochloride and dicyandiamide in boiling water; M. P. 215–216° C.), 123 parts of acetone, 245 parts of water and 6.7 parts of 35.6% aqueous hydrochloric acid are heated together under reflux for 17 hours. The solution is evaporated under reduced pressure to half its original volume and cooled to 5° C. Ether is added and the mixture is stirred and an excess of sodium hydroxide solution is added. The mixture is filtered and the residue is washed with ether and dried. It is dissolved in an excess of dilute aqueous hydrochloric acid, filtered and the filtrate is neutralised with aqueous ammonia. Saturated salt solution is added, the mixture is filtered and the residue is washed with water and dried. It is crystallised from a mixture of ethanol and ether. 2:4-diamino-1 - (3:4 - dibromophenyl) - 6:6 - dimethyl - 1:6 - dihydro-1:3:5-triazine hydrochloride is thus obtained as colourless crystals of M. P. 195–196° C.

Example 9

20 parts of 3:5-dichlorophenylbiguanide hydrochloride (M. P. 268–269° C.), 7.3 parts of 35.6% aqueous hydrochloric acid, 350 parts of acetone and 200 parts of water are heated together under reflux for 16 hours. The solution is evaporated to a small volume under reduced pressure, decolourising carbon is added and the mixture is filtered. The filtrate and 200 parts of ether are stirred together at 0.5° C. and 35 parts of 40% sodium hydroxide solution are added. The mixture is filtered and the residue is washed with ether and dried. It is dissolved in dilute aqueous hydrochloric acid and filtered. Crystals separate from the filtrate. It is filtered and the residue washed with water. It is then crystallised from water to give 2:4-diamino-1-(3:5-dichlorophenyl)-6:6-dimethyl - 1:6 - dihydro - 1:3:5 - triazine hydrochloride of M. P. 186–187° C.

Example 10

20 parts of 3:4-dichlorophenylbiguanide hydrochloride, 100 parts of methyl ethyl ketone, 7.2 parts of 35.6% aqueous hydrochloric acid and 200 parts of water are stirred together at 50° C. for 20 hours. The solution is evaporated to half its original volume under reduced pressure, decolourising carbon is added and the mixture is filtered. 200 parts of ether are added to the filtrate, the mixture is cooled to 0–5° C., stirred and 20 parts of 40% sodium hydroxide solution are added. The mixture is filtered and the residue is washed with ether and dried. It is dissolved in dilute aqueous hydrochloric acid, filtered and the filtrate is cooled in ice and neutralised with aqueous ammonia. The mixture is filtered and the residue is washed with water and dried. It is crystallized from water as colourless crystals of 2:4-diamino-1-(3:4-dichlorophenyl) - 6 - methyl - 6 - ethyl - 1:6 - dihydro-1:3:5-triazine hydrochloride of M. P. 210–211° C.

By using propionaldehyde in place of methyl ethyl ketone, and working in a similar manner there is obtained 2:4 - diamino - 1 - (3:4 - dichlorophenyl) - 6 - ethyl-1:6 - dihydro - 1:3:5 - triazine hydrochloride, which is crystallised from ethanol and ethyl acetate and has M. P. 233–234° C.

Similarly, using m-chlorophenylbiguanide hydrochloride in place of 3:4-dichlorophenyldiguanide hydrochloride there is obtained 2:4-diamino-1-m-chlorophenyl-6-methyl - 6 - ethyl - 1:6 - dihydro - 1:3:5 - triazine hydrochloride, of M. P. 180–181° C.

Similarly, using p-chlorophenylbiguanide hydrochloride in place of 3:4-dichlorophenylbiguanide hydrochloride, and n-butyraldehyde in place of methyl ethyl ketone, there is obtained 2:4-diamino-1-p-chlorophenyl-6-n-propyl - 1:6 - dihydro - 1:3:5 - triazine hydrochloride of M. P. 239–240° C.

Similarly, using 3-bromo-4-chlorophenylbiguanide hydrochloride (M. P. 223–224° C.) and acetone, there is obtained 2:4 - diamino - 1 - (3 - bromo - 4 - chlorophenyl) - 6:6 - dimethyl - 1:6 - dihydro - 1:3:5 - triazine hydrochloride which crystallises from ethanol and ether and has M. P. 197° C.

Similarly, using 3-chloro-4-iodophenylbiguanide hydrochloride (M. P. 194–195° C.) and acetone, there is obtained 2:4 - diamino - 1 - (3 - chloro - 4 - iodophenyl)-6:6 - dimethyl - 1:6 - dihydro - 1:3:5 - triazine hydrochloride, which crystallises from water and has M. P. 205° C.

Similarly, using m-nitrophenylbiguanide hydrochloride (M. P. 176° C.) and acetone, there is obtained 2:4-diamino - 1 - m - nitrophenyl - 6:6 - dimethyl - 1:6 - dihydro - 1:3:5 - triazine hydrochloride which crystallises from water and has M. P. 204–206° C.

Similarly, using p-ethylsulphonylphenylbiguanide hydrochloride (M. P. 238–239° C.) and acetone, there is obtained 2:4 - diamino - 1 - p - ethylsulphonylphenyl-6:6 - dimethyl - 1:6 - dihydro - 1:3:5 - triazine hydrochloride which crystallises from aqueous ethanol and has M. P. 251–252° C.

Example 11

20 parts of 3:4-dichlorophenylbiguanide hydrochloride, 17.8 parts of isobutyraldehyde, 6.4 parts of 35.6% aqueous hydrochloric acid and 75 parts of water are stirred together at 50° C. for 16 hours. The solution is cooled, filtered and the residue is suspended in 50 parts of water. 200 parts of ether are added and the mixture is cooled and stirred whilst 20 parts of 40% sodium hydroxide are added. The mixture is filtered and the residue washed with ether and dried. It is dissolved in dilute hydrochloric acid, decolourising carbon is added and the mixture is filtered. The filtrate is neutralised with aqueous ammonia and filtered. The residue is washed with water and dried. It is crystallised from water and there are thus obtained colourless crystals of 2:4-diamino-1 - (3:4 - dichlorophenyl) - 6 - isopropyl - 1:6 - dihydro-1:3:5-triazine hydrochloride of M. P. 237–238° C.

Example 12

By working in exactly the same manner as described in Example 11 except that n-butyraldehyde is used in place of isobutyraldehyde there are obtained colourless crystals of 2:4-diamino-1-(3:4-dichlorophenyl)-6-n-propyl-1:6-dihydro-1:3:5-triazine hydrochloride of M. P. 231° C.

Example 13

24.8 parts of p-chlorophenylbiguanide hydrochloride, 25.6 parts of propionaldehyde, 10.3 parts of 35.6% aqueous hydrochloric acid and 75 parts of water are stirred together at 50° C. for 17 hours. The mixture is cooled and shaken with ether and the ether layer is discarded. The aqueous part together with 150 parts of ether is cooled to 0–5° C. and stirred whilst 40% sodium hydroxide solution is added. The mixture is filtered and the residue washed with ether and dried. It is dissolved in dilute aqueous hydrochloric acid and neutralised with ammonia. Saturated salt solution is added and the mixture is filtered and the residue is washed with water and dried. It is crystallised from water to give colourless crystals of 2:4-diamino-1-p-chlorophenyl-6-ethyl-1:6-dihydro-1:3:5-triazine hydrochloride of M. P. 244–245° C.

*Example 14*

By working in the same manner as described in Example 13 except that p-chlorophenylbiguanide hydrochloride is replaced by m-chlorophenylbiguanide hydrochloride there is obtained 2:4-diamino-1-m-chlorophenyl-6-ethyl-1:6-dihydro-1:3:5-triazine hydrochloride of M. P. 236–237° C.

*Example 15*

35 parts of phenylbiguanide, 40 parts of hydrochloric acid, 164 parts of acetone and 400 parts of water are heated together under reflux for 15 hours. The solution is evaporated to half its bulk under reduced pressure and is then cooled to 3° C. 360 parts of ether are added, and the mixture is made alkaline to Clayton yellow by the addition, with stirring, of 40% aqueous sodium hydroxide solution. It is then filtered, and the solid product is washed with ether to give 2:4-diamino-1-phenyl-6:6-dimethyl-1:6-dihydro-1:3:5-triazine as a colourless solid of M. P. 138–139° C. The mono-hydrochloride of this base has M. P. 204° C.

*Example 16*

12.4 parts of p-chlorophenylbiguanide mono-hydrochloride, 5 parts of 36% hydrochloric acid, 40 parts of acetaldehyde and 100 parts of water are maintained at 50° C. for 15 hours in a closed vessel. The solution is evaporated to half its bulk under reduced pressure and is cooled to 3° C. 250 parts of ether are added, and the mixture is made alkaline to Clayton yellow by addition of 40% aqueous sodium hydroxide solution. It is then filtered and the solid product is washed with ether. It may be recrystallised by slow addition of ether to a solution in ethanol, giving 2:4-diamino-1-p-chlorophenyl-6-methyl-1:6-dihydro-1:3:5-triazine, of M. P. 174° C. The monohydrochloride of this base has M. P. 240–241° C.

*Example 17*

12.4 parts of p-chlorophenylbiguanide monohydrochloride, 5 parts of 36% hydrochloric acid, 40 parts of isobutyraldehyde, 20 parts of ethanol and 100 parts of water are heated at 70° C. for 15 hours. The product is isolated by a method similar to that described in Example 16, giving 2:4-diamino-1-p-chlorophenyl-6-isopropyl-1:6-dihydro-1:3:5-triazine, of M. P. 144–146° C. The monohydrochloride of this base has M. P. 226–227° C.

*Example 18*

12.4 parts of p-chlorophenylbiguanide hydrochloride, 62 parts of acetone, 5.2 parts of 35.6% aqueous hydrochloric acid and 124 parts of water are heated together at 50° C. for 4 hours. The solution is evaporated under reduced pressure and ether is added. The mixture is cooled to 5° C. and stirred and an excess of 40% sodium hydroxide solution is added. The mixture is filtered and the residue is washed with ether. It is dissolved in dilute aqueous hydrochloric acid and filtered and the filtrate neutralised with aqueous ammonia. The mixture is filtered and the residue is washed with water and dried. There is thus obtained in good yield 2:4-diamino-1-p-chlorophenyl-6:6-dimethyl-1:6-dihydro-1:3:5-triazine hydrochloride.

*Example 19*

By proceeding exactly as described in Example 18 except that the reactants are kept together at 20° C. for 4 days instead of at 50° C. for 4 hours, the same product in good yield is obtained.

*Example 20*

By proceeding exactly as described in Example 18 except that, instead of 5.2 parts, 10.4 parts of 35.6% aqueous hydrochloric acid are used and except that the reactants are heated at 50° C. for 17 hours, the same product in good yield is obtained.

*Example 21*

By proceeding exactly as described in Example 20 except that 0.52 part of 35.6% aqueous hydrochloric acid are used in place of 10.4 parts, the same product in good yield is obtained.

*Example 22*

By using 14.2 parts of 3:4-dichlorophenylbiguanide hydrochloride in place of p-chlorophenylbiguanide hydrochloride in Example 21 there is obtained in good yield 2 : 4 - diamino - 1 - (3 : 4 - dichlorophenyl) - 1 : 6 - dihydro-1:3:5-triazine hydrochloride.

*Example 23*

By working exactly as described in Example 20 except that the hydrochloric acid is replaced by 2.5 parts of 9.8% aqueous sulphuric acid there is obtained in good yield the same product.

*Example 24*

By working as described in Example 20 except that 10.57 parts of p-chlorophenylbiguanide are used in place of the hydrochloride and that 27.5 parts of 9.8% aqueous sulphuric acid are used in place of the hydrochloric acid there is obtained in good yield the same product.

*Example 25*

By working as described in Example 24 except that 13.5 parts of 48% aqueous hydrobromic acid are used in place of the sulphuric acid there is obtained in good yield the same product.

*Example 26*

10 parts of p-chlorophenylbiguanide hydrochloride, 4.0 parts of 35.6% aqueous hydrochloric acid, 8.3 parts of acetaldehyde diethylacetal and 30 parts of water are stirred together at 50° for 15 hours. The mixture is cooled to 0° C. and 65 parts of ether are added. 15 parts of 40% sodium hydroxide solution are added slowly whilst the mixture is stirred at 0° C. The mixture is filtered and the residue is washed with ether and dried. It is dissolved in 7% aqueous hydrochloric acid, the solution is clarified with carbon and filtered. The filtrate is neutralised with aqueous ammonia to precipitate 2:4-diamino-1-p-chlorophenyl-6-methyl-1:6-dihydro-1:3:5-triazine hydrochloride. It is crystallised from water and then has M. P. 235° C.

*Example 27*

In exactly the same manner as described in Example 26 3:4-dichlorophenylbiguanide hydrochloride and acetaldehyde diethylacetal give 2:4-diamino-1-(3:4-dichlorophenyl)-6-methyl-1:6-dihydro-1:3:5-triazine hydrochloride, which is crystallised from water and then has M. P. 221–222° C.

*Example 28*

In exactly the same manner as described in Example 26 m-chlorophenylbiguanide hydrochloride and acetaldehyde diethylacetal give 2:4 - diamino - 1 - m - chlorophenyl - 6-methyl-1:6-dihydro-1:3:5-triazine. The base thus obtained is dissolved in alcoholic hydrogen chloride and ether is added to precipitate the hydrochloride which is crystallised from ethanol:ether and has M. P. 194° C.

*Example 29*

5 parts of p-chlorophenylbiguanide hydrochloride, 2.1 parts of 35.6% aqueous hydrochloric acid, 5.75 parts of acetone diethylacetal and 50 parts of water are heated together at 50° C. for 17 hours. The solution is cooled, carbon is added and the mixture is filtered. 50 parts of ether are added to the filtrate and 25 parts of 40% sodium hydroxide solution are then added slowly to the stirred mixture kept at 0–5° C. The mixture is filtered and the residue is washed with ether and dried. It is dissolved in 7% aqueous hydrochloric acid, the solution is neutralised with aqueous ammonia and the mixture is filtered. The residue consists of 2:4-diamino-1-p-chlorophenyl-6:6-dimethyl-1:6-dihydro-1:3:5-triazine hydrochloride.

*Example 30*

12.4 parts of p-chlorophenylbiguanide hydrochloride, 16.2 parts of acetone sodium bisulphite compound, 15.8 parts of 35.6% aqueous hydrochloric acid and 40 parts of water are stirred at 50° C. for 16 hours. The solution is treated exactly as described in Example 29. The product consists of 2:4-diamino-1-p-chlorophenyl-6:6-dimethyl-1:6-di-hydro-1:3:5-triazine hydrochloride.

*Example 31*

12.4 parts of p-chlorophenylbiguanide hydrochloride, 5.25 parts of 35.6% aqueous hydrochloric acid, 15.1 parts of isopropenyl acetate and 200 parts of water are stirred at 50° C. for 18 hours. The solution is treated exactly as described in Example 29 to give the same product.

*Example 32*

25.5 parts of p-chloroaniline, 21.0 parts of dicyandiamide, 90 parts of acetone, 41.5 parts of 35.6% aqueous hydrochloric acid and 320 parts of water are boiled together under reflux for 15 hours. The solution is concentrated under reduced pressure and is then treated exactly as described in Example 29 and there is thus obtained the same product.

*Example 33*

By proceeding as in Example 10 except that acetone is used in place of methyl ethyl ketone and $N^1$-p-chlorophenyl-$N^5$-methylbiguanide hydrochloride in place of 3:4-dichlorophenylbiguanide hydrochloride, there is obtained 2-amino-1-p-chlorophenyl-6:6-dimethyl-4-methylamino-1:6-dihydro-1:3:5-triazine. This is purified by dissolving in 7.3% hydrochloric acid, adding dilute aqueous ammonia to give a pH of 5, filtering and then adding a saturated solution of sodium chloride in water to the filtrate to bring about crystallisation. The hydrochloride is thus obtained as a hemihydrate of M. P. 172–173° C.

*Example 34*

22.8 parts of $N^1$-p-chlorophenyl-$N^5$:$N^5$-dimethylbiguanide hydrochloride hemihydrate, 40 parts of 7.3% hydrochloric acid and 160 parts of acetone are boiled together for 18 hours. Excess acetone is then removed by distillation under reduced pressure and the residual solution is treated with 5% aqueous ammonia to give a pH of 5. The solid thus precipitated is filtered off and 170 parts of a saturated aqueous solution of sodium chloride are added to the filtrate. The precipitate is allowed to solidify completely and is then filtered off and drained thoroughly. It is stirred with 25 parts of water and filtered. To the filtrate there is added 48 parts of a saturated solution of sodium chloride and it is cooled to 0° C. and filtered. The solid is dried over phosphorus pentoxide. Further purification may be effected by dissolving the product in 36 parts of ethanol, filtering and adding 230 parts of ethylacetate followed by 6.5 parts of a 15% solution of hydrogen chloride in ethanol. The solid thus obtained is filtered off and redissolved in 18 parts of water and to the solution there is added sufficient 30% aqueous ammonia to give a pH of 5, followed by 18 parts of a saturated aqueous solution of sodium chloride. 2-amino-1-p-chlorophenyl-6:6-dimethyl-4-dimethylamino-1:6-dihydro-1:3:5-triazine hydrochloride crystallises out in a hydrated form which melts at 122–124° C.

*Example 35*

24.8 parts of p-chlorophenylbiguanide hydrochloride, 10.6 parts of 36% hydrochloric acid, 2.5 parts of mercuric chloride and 250 parts of water are stirred together at 50° C. for 16 hours whilst a stream of acetylene is bubbled through the mixture. Carbon is added, the mixture is filtered and the filtrate is cooled. It is again filtered, the filtrate is shaken with ether at 0–5° C. whilst 40% sodium hydroxide solution is added. The precipitate is separated, washed with ether and dried. It is dissolved in 7% hydrochloric acid, an excess of aqueous ammonia is added and then an excess of copper sulphate solution. The mixture is filtered, the filtrate is acidified with 36% hydrochloric acid and hydrogen sulphide is passed through the solution to excess. The mixture is again filtered, the fitrate is neutralised with aqueous ammonia and aqueous picric acid is added thereby precipitating 2:4-diamino-1-p-chlorophenyl-6-methyl-1:6-dihydro-1:3:5-triazine picrate which may be recrystallised from 2-ethoxyethanol and then has M. P. 256–257° C.

*Example 36*

A solution of 21.2 parts of benzaldehyde in 80 parts of ethanol is added to a mixture of 24.8 parts of p-chlorophenylbiguanide hydrochloride, 10.3 parts of 36% hydrochloric acid and 100 parts of water. The mixture is heated at 50° C. for 16 hours, it is then cooled and filtered. The crystalline residue is washed with ethanol and dried. It is recrystallised from water to give 2:4-diamino-1-p-chlorophenyl-6-phenyl-1:6-dihydro-1:3:5-triazine hydrochloride of M. P. 241° C.

*Example 37*

To a solution of 12.4 parts of p-chlorophenylbiguanide hydrochloride in 50 parts of water and 5.2 parts of 35% hydrochloric acid is added a solution of p-dimethylaminobenzaldehyde in 120 parts of ethanol and 10.4 parts of 36% hydrochloric acid and the mixture is heated at 50° C. for 16 hours. The solution is concentrated under reduced pressure, cooled and filtered. The filtrate is cooled to 0° C. and the base precipitated by 40% sodium hydroxide solution in the presence of ether. The mixture is filtered and the residue washed with ether and dried. It is dissolved in 7% hydrochloric acid and then neutralised with aqueous ammonia. The mixture is filtered and the residue purified by repeated dissolution in 7% hydrochloric acid and precipitation with aqueous ammonia to give 2:4-diamino-1-p-chlorophenyl-6-p-dimethylaminophenyl-1:6-dihydro-1:3:5-triazine hydrochloride of M. P. 217° C.

*Example 38*

A solution of 4.65 parts of dicyandiamide in 125 parts of water and 27.7 parts of 7% hydrochloric acid is mixed with 10 parts of benzylidene aniline and stirred at 70° C. for 24 hours. It is cooled and the aqueous part separated from the small amount of oil, decolourised with carbon, filtered and cooled to 0° C. 40% sodium hydroxide solution is added and the mixture is filtered. The residue is washed with ether, dried and dissolved in 7% hydrochloric acid. The solution is clarified and neutralised with aqueous ammonia. It is filtered and the residue is washed with water and dried. The product is crystallised from water and consists of 2:4-diamino-1:6-diphenyl-1:6-dihydro-1:3:5-triazine hydrochloride of M. P. 232–233° C.

What I claim is:
1. Triazine derivatives of the formula

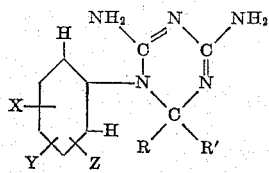

wherein X is selected from the group consisting of hydrogen, nitro, lower alkyl, alkoxy, chlorine, bromine and iodine, Y and Z are selected from the group consisting of hydrogen, lower alkyl, chlorine, bromine and iodine, R is selected from the group consisting of hydrogen and lower alkyl and R' is lower alkyl.

2. A compound represented by the following formula:

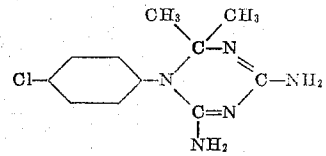

3. 2:4-diamino-1-(3:4-dichlorophenyl)-6:6 - dimethyl-1:6-dihydro-1:3:5-triazine.

4. 2:4-diamino - 1 - (3:4-dibromophenyl)-6:6-dimethyl-1:6-dihydro-1:3:5-triazine.

5. 2:4-diamino - 1 - (3-chloro-4-iodophenyl)-6:6-dimethyl-1:6-dihydro-1:3:5-triazine.

6. 2:4-diamino-1 - (3-bromo-4-chlorophenyl) - 6:6-dimethyl-1:6-dihydro-1:3:5-triazine.

7. Process for the manufacture of the triazine derivatives claimed in claim 1 which comprises interacting a biguanide derivative of the formula

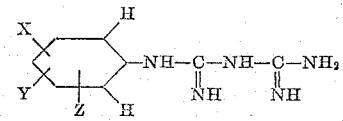

wherein X, Y and Z have the significance stated in claim 1 with a compound selected from the group consisting of aldehydes and ketones of the formula RR'C=O wherein R and R' have the significance stated in claim 1, in the presence of at least one equivalent proportion of a strong mineral acid.

8. The process of claim 7 wherein the biguanide derivative is used in the form of a mineral acid salt.

References Cited in the file of this patent
UNITED STATES PATENTS

| | | |
|---|---|---|
| 2,273,382 | Simons | Feb. 17, 1942 |
| 2,515,116 | Dudley | July 11, 1950 |
| 2,517,824 | Appelquest | Aug. 8, 1950 |
| 2,541,005 | Oldham | Feb. 6, 1951 |